Figure 1:
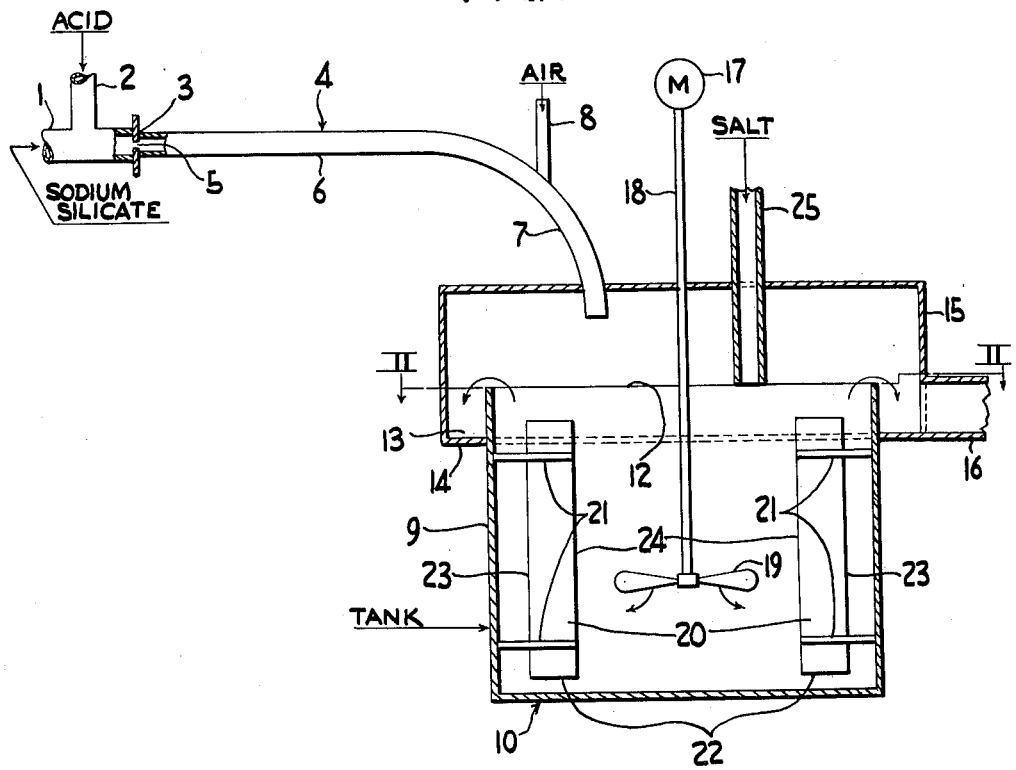

INVENTOR.
GOSTA LAGERSTROM

United States Patent Office 3,034,914
Patented May 15, 1962

3,034,914
PREPARATION OF SILICEOUS PRODUCTS
Gosta B. Lagerstrom, Barberton, Ohio, assignor, by mesne assignments, to Pittsburgh Plate Glass Company
Filed May 5, 1959, Ser. No. 811,184
42 Claims. (Cl. 106—306)

This invention deals with precipitated finely divided siliceous pigments, notably siliceous pigments especially suited for use in paper. It further involves preparation of these siliceous materials.

Incorporation of materials in paper for the purpose of improving various properties has been long recognized. Titanium dioxide is one such material that is effectively used for improving the properties of paper, especially the optical properties such as opacity. Its relatively high cost, however, limits use of titanium dioxide to the more expensive papers. Other less expensive materials such as diatomaceous earth and natural clays do not significantly improve optical properties such as the opacity and brightness of paper. An inexpensive effective paper pigment is thus both needed and desirable.

By virtue of this invention, finely divided siliceous pigments are provided which are especially suited for use in paper. They are highly effective in enhancing optical properties of paper. Paper in which they are dispersed evidences opacity and brightness values (optical properties) considerably superior to those attained with various other siliceous materials. In addition, these pigments may be prepared from low cost raw materials and thus, are relatively inexpensive. These, among other features, mark these pigments as most dsirable.

In accordance with the present invention, inexpensive finely divided siliceous materials especially valuable as paper pigments may be prepared from sodium silicate or like alkali metal silicate. Thus, it has now been found that pigmentary, finely divided siliceous pigment is provided by rapidly distributing a metal salt, e.g., calcium chloride, in an aqueous siliceous solution containing an $SiO_2$ to alkali metal oxide ratio, e.g., as a rule at least 5 moles (usually 5 to 20 moles) of $SiO_2$ per mole of alkali metal oxide, such that the solution will eventually precipitate siliceous material, and promptly precipitating siliceous pigment from the resulting mixture before the solution manifests its ability to itself precipitate siliceous material. Sufficient salt is employed and effectively distributed to initiate this precipitation. A major portion, usually substantially the entire $SiO_2$ content of the solution, is rapidly precipitated as siliceous pigment.

Providing this aqueous siliceous solution is best accomplished by controllably mixing sodium silicate or like alkali metal silicate and an acid such as hydrochloric acid. One important consideration is the correlation of the ratio of acid such as hydrochloric acid to sodium silicate or like metal silicate such that the amount of acid is only sufficient to neutralize partially the alkali metal silicate and provide the siliceous solution having at least 5 moles of $SiO_2$ per mole of alkali metal oxide. Thus, it has been found in accordance with preferred embodiments hereof, using the more common reactants, and in the production of the better paper pigments that the overall ratio of acid to alkali metal silicate when the alkali metal silicate contains about 3.0 to 3.6 moles of $SiO_2$ per mole of alkali metal oxide is between 0.3 to 0.7, ideally between 0.4 and 0.6, equivalents of acid per equivalent of metal oxide of the alkali metal silicate.

Moreover, effective preparation of the pigment depends upon precipitating the pigment from the siliceous solution which is substantially free of precipitated siliceous material formed as a consequence of mixing the sodium silicate with acid during and after providing the siliceous solution. Premature precipitation of siliceous material from the siliceous solution (notwithstanding its tendency to precipitate siliceous material upon standing) is preferably avoided, but at least kept to a very minimum. Thus, until the components, usually aqueous solutions, are properly mixed to effect precipitation in accordance herewith, the solutions are ideally free of solid siliceous material. Depending upon the particular method or embodiment, as hereinafter will be described in greater detail, various conditions are observed to insure that the siliceous solution is substantially free of any precipitated siliceous material formed from mixing the sodium silicate and acid.

Thus, the present invention involves preparing finely divided siliceous pigments, particularly notable for their paper pigmenting qualities, by forming an aqueous medium having a composition corresponding to that provided by mixing an acid such as hydrochloric acid with sodium silicate corresponding to the formula $Na_2O(SiO_2)_{3.3}$ or like alkali metal silicate in the ratio of 0.3 to 0.7 equivalents of the acid per equivalent of the alkali metal oxide of the silicate and precipitating the silica contents thereof as siliceous pigment. This precipitation is brought about or initiated by the presence in the medium (ideally by the distribution throughout the medium) of a water soluble salt such as calcium chloride.

Avoidance of any substantial amount of undesirable siliceous precipitate derived from the alkali metal silicate, e.g., precipitate formed as a consequence of mixing the alkali metal silicate and acid or from the resulting siliceous solution, is observed notwithstanding that in many instances the siliceous solution is in a metastable condition, e.g., will upon standing develop a siliceous precipitate.

It is believed (although the invention is not predicated thereupon) that the present invention entails establishing an aqueous solution of silicic acid having its silicic acid content as low molecular weight silicic acids (e.g., a solution of silicic acid being substantially free of insoluble siliceous products formed as a consequence of mixing acid with silicate to form the solution) and precipitating siliceous pigment from an aqueous medium of such silicic acid solution, and also (a) silicate ion (e.g., as provided by unacidified alkali metal silicate in aqueous solution) and (b) a water soluble salt such as calcium chloride in an amount sufficient to initiate or accelerate precipitation of siliceous product. In ideal performance of this invention, precipitation is effected rapidly and simultaneously with the establishment of a homogeneous aqueous medium containing low molecular weight silicic acid, silicate ion and salt.

Characteristic of the siliceous products are their value as paper pigments. When dispersed in paper, the optical properties of the paper are markedly improved. Moreover, many siliceous pigmentary compositions are exemplified by their considerable degree of uniformity in both ultimate particle size and floc size.

These flocculated pigments have as their primary aggregates flocs formed from a plurality of ultimate particles. Under high magnification of an electron microscope such flocs resemble clusters of grapes, each cluster representative of a floc, the individual grapes denoting the ultimate particle. While comprising an agglomeration of fine ultimate particles, flocs characterizing ideal paper pigments are nevertheless sufficiently strong to resist substantial degradation (deflocculation or deaggregation) during the normal treatment of a paper pulp according to the practices prevailing in the paper industry.

Such flocs are not to be confused with pellets or macroscopic aggregates which may be formed from a plurality of the flocs. These pellets disintegrate readily into the constituent flocs.

Various procedures may be utilized in the practice of this invention.

According to one embodiment, valuable pigmentary siliceous materials may be prepared effectively by rapidly acidifying an aqueous solution of sodium silicate or like alkali metal silicate with an acid such as the water soluble acid exemplified by hydrochloric acid to a relatively high acidic solution, usually a pH below about 4, ideally between pH 1 and 3. Besides rapidly admixing the acid and silicate and avoiding the development of a pH substantially above 4 during the mixing, more than the stoichiometric amount of acid required to acidify the alkali of the alkali metal silicate is used. Between 1.1 to 2.0 equivalents of acid per equivalent of alkali metal oxide of the silicate in solution is typical. Even larger excesses of acid may be employed, but as hereinafter described in detail, a corresponding adjustment in a further step takes into account this amount of acid. The resulting solution because of its low pH and absence of silicate ion (excess acid being present) is relatively stable and hence, generally will not upon standing for a reasonable period of time, usually several hours, precipitate any siliceous material.

Before precipitation of any siliceous product commences in this acidified solution, e.g., substantially free of any undesirable precipitated siliceous material, sodium silicate and a water soluble salt such as calcium chloride or the like are added. Sufficient sodium silicate or like alkali metal silicate is added to provide a solution having at least 5 moles of $SiO_2$ per mole of alkali metal oxide, or in other words, a composition corresponding to that provided by mixing acid and an alkali metal silicate having about 3.3 moles of $SiO_2$ per mole of alkali metal oxide in the ratio of 0.3 to 0.7 equivalents of the acid per equivalent of the alkali metal oxide of the total amount of sodium silicate employed, taking into account the acid and sodium silicate values of the acidified sodium silicate as well as the subsequently added sodium silicate. The excess acid employed during the formation of an aqueous solution of acidified sodium silicate at pH 4 or lower by rapid acidification of the sodium silicate thus influences the amount of sodium silicate subsequently added. Larger excesses of acid require larger amounts of sodium silicate.

Upon establishing the aqueous medium in accordance with the foregoing steps, precipitation of the desired siliceous pigments is effected, almost instantaneously. That is, as the proper aqueous medium is established (one which contains silicate ions, the acidified sodium silicate and a salt such as calcium chloride) the desired product is precipitated.

In (a) the absence of silicate ion or (b) when the equivalents of acid exceed the equivalents of alkali metal oxide in the silicate in solution, the system is relatively stable. Thus, with either of such conditions prevailing, calcium chloride or like salt may be added without precipitation.

It is, accordingly, possible to acidify rapidly an aqueous solution of sodium silicate to provide at pH 4 or lower a relatively stable solution and include in such solution calcium chloride or like salt. For example, alkali metal silicate solution may be added to a vigorously agitated liquid body of calcium chloride and the acid, e.g., under conditions avoiding localized high concentration of alkali metal silicate or the establishment of the body at an alkaline pH. As a rule, conditions of such addition are so established that the alkali metal silicate is for practical purposes instantaneously acidified to an acidic pH below 4. Precipitation of product from a medium formed in this manner is accomplished by adding alkali metal silicate in amounts sufficient to provide the appropriate ratio of acid to alkali metal oxide. This usually involves adding such alkali metal silicate to raising rapidly if not almost instantaneously the pH above about 6, ideally above 7.

Control of both temperature and concentraion of sodium silicate are facilitating considerations for effective precipitation. Acidified sodium silicate solutions evidence minimized tendency to form precipitates undesirable in this invention at lower temperatures and when more dilute. Temperatures below about 55° C., and ideally in the range of between −10° C. and 40° C. are thus preferable. Higher temperatures, e.g., 100° C. or more, are possible, but even more rigid control of other factors may be necessary. Typical $SiO_2$ concentrations in the acidified sodium silicate solutions are from 2 to 150 grams $SiO_2$ per liter, preferably 3 to 75 grams $SiO_2$ per liter.

The following examples illustrate the preparation of siliceous pigments according to the above described embodiment of the invention:

EXAMPLE I

A stirrer equipped glass flask was charged with 2000 milliliters of an aqueous solution containing 86 grams of calcium chloride, 34.4 grams of sodium chloride and 64 grams of 12 N hydrochloric acid and the contents cooled to 0° C. To this, 800 milliliters of an aqueous sodium silicate solution at 0° C. containing 20 grams per liter of $Na_2O$ was added rapidly while agitating vigorously. This sodium silicate contained 3.12 moles of $SiO_2$ per mole of $Na_2O$. A water clear acidified sodium silicate solution at 3° C. resulted. While the solution was still water clear, it was fed at the rate of 1.20 liters per minute to one arm of a T tube and 1200 milliliters of a sodium silicate solution at 3° C. of the same composition as that used previously was fed at the rate of 0.52 liter per minute to the other arm of the T. The arms were 9 millimeters in inner diameter. The leg of the tube was 15 millimeters in length, the first 7 inches from its point of juncture with the arms having an inner diameter of 9 millimeters. Thereafter, the leg tapered uniformly to an inner diameter of 4 millimeters. Opposite the leg above the arms, an air inlet (2.5 millimeters inner diameter) was provided through which compressed air at 15 pounds per square inch gauge pressure was fed.

The material discharged from the leg was collected as a slurry at 6.5° C. in a bucket. Product was recovered from the slurry by vacuum filtering, water washing, drying in a laboratory oven at 105° C. for 12 hours and milling in a Mikropulverizer. The resulting pigment was a finely divided flocculated product having an average ultimate particle size of 0.06 to 0.4 micron and a BET surface area of 78 square meters per gram.

EXAMPLE II

Fourteen liters of a solution was prepared from sodium silicate, calcium chloride, sodium chloride and hydrochloric acid, as in Example I, but at 25° C. A momentary overconcentration of sodium silicate at the end of silicate addition gave rise to a small inconsequential amount of precipitate. This solution was mixed with 6 liters of sodium silicate solution at 25° C. by their feed at the respective rates of 0.51 and 0.22 liter per minute through pipes of 4 millimeters inner diameter to a cylindrical tank 130 millimeters high and 150 millimeters in diameter. Two 180 degree spaced baffles 80 millimeters high and 15 millimeters wide were anchored to the bottom and side of the tank in a vertical plane passing the major vertical axis of the cylinder. The contents of the tank were agitated during the process by rotating an air driven drive axis disposed along the major vertical axis of the tank terminating in a two blade propeller, the lowermost surfaces of which were 10 millimeters from the tank bottom. Product slurry at 25° C. was withdrawn continuously through two 180 degree spaced, 20 millimeter diameter holes in the tank, the lowest point of each hole being 65 millimeters above the tank bottom and collected.

One half by volume of the slurry was filtered, washed, dried and milled in a Mikropulverizer (a hammer mill type of milling device). This finely divided siliceous product had a BET surface area of 45 square meters per gram.

The second half of the slurry was heat aged by maintaining it at 75° C. to 85° C. for 3 days, then filtered, washed, dried and milled. The finely divided, friable, white, flocculated siliceous product had an ultimate particle size of 0.05 to 0.2 micron and a BET surface area of 34 square meters per gram.

EXAMPLE III

To a vigorously agitated 1.8 liter aqueous solution containing 109 grams of 12 N hydrochloric acid, 106 grams of finely divided, Mikropulverized $Na_2SiO_3.5H_2O$ was slowly added. Thereafter, 109 grams more of 12 N hydrochloric acid was added, following which an additional 106 grams of finely divided, Mikropulverized $Na_2SiO_3.5H_2O$ was also added. Throughout, the temperature of the aqueous solution was maintained below 8° C. by ice addition.

To this acidified sodium silicate solution 107.5 grams of calcium chloride was added and the resulting solution substantially free of precipitate was adjusted by addition of water to a volume of 3.5 liters. The resulting solution at a temperature of 25° C. was fed at the rate of 1.4 liters per minute to one arm of the T tube described in Example I. At the rate of 0.60 liter per minute, 1.5 liters of aqueous sodium silicate solution at 25° C. containing 20 grams per liter of $Na_2O$ and 3.12 moles of $SiO_2$ per mole of $Na_2O$ was fed to the other arm. Compressed air at 15 pounds per square inch gauge was fed.

The slurry was collected in a bucket, divided into two equal volume portions. Each portion was treated in accordance with treatment of the portions described in Example II. The heat aged product was a finely divided fluocculated, friable pigment having a BET surface area of 31 square meters per gram and an ultimate particle size of 0.06 to 0.4 micron. The other finely divided siliceous product had a BET surface area of 100 square meters per gram.

According to another embodiment by which precipitation of exemplary siliceous paper pigments may be accomplished, alkali metal silicate solution is partially neutralized with acid to form a siliceous solution and promptly thereupon salt such as calcium chloride is added to the solution. In such embodiment, an aqueous solution of sodium silicate having 3.3 moles of $SiO_2$ per mole of $Na_2O$ (or like alkali metal silicate) is mixed rapidly with an acid such as hydrochloric acid using between 0.3 to 0.7 equivalents of acid per equivalent of alkali metal oxide in the alkali metal silicate. The resulting partially neutralized sodium silicate solution is thereafter promptly mixed with calcium chloride or like salt whereupon siliceous product precipitates. This partially neutralized sodium silicate solution is unstable and tends to precipitate siliceous solids. Addition of the calcium chloride or like salt promptly and effectively to the acidified sodium silicate solution before such precipitation or formation of solid occurs is, therefore, important.

This prompt salt addition is best accomplished by mixing the calcium chloride (or like salt) and the acidified sodium silicate solution within less than about 1 minute after the acid has been added to the sodium silicate in forming the partially neutralized solution of sodium silicate. If greater periods of time elapse, there is substantial risk of premature undesirable precipitation or formation of solid siliceous material, or formation of considerable undesirable high molecular weight silicic acid.

The maximum permissible period of time which may elapse between formation of the partially acidified sodium silicate solution and addition of salt for the purpose of realizing siliceous precipitates of optimum value as paper pigments is interrelated with the degree of acidification, the temperature of the acidified sodium silicate solution and the $SiO_2$ concentration. Under most practical operating conditions, e.g., temperatures capable of practical attainment under commercial consideration and $SiO_2$ concentrations which are not so dilute as to make processing the pigment during recovery economically unfeasible, the maximum period of time is less than 1 minute and frequently is less than 5 seconds, notably less than about 0.5 second.

The lower the temperature of the acidified solution the greater leeway or lapse there may be between acidification and salt addition. Also, the more dilute the acidified sodium silicate solution is the greater the maximum time between acidification and addition of salt.

At temperatures substantially about 55° C., even with extremely dilute but practical concentrations of $SiO_2$, the permissible period of time separating the acidification from salt addition may become quite short, if impractical. Temperatures of 0° C. to 55° C. are thus most expedient.

Moreover, the $SiO_2$ concentration of the partially neutralized sodium silicate solution is of significance. The higher the $SiO_2$ concentration the more rapidly upon mixing with acid does the resulting system tend to form undesirable solid or silicate material. Lower $SiO_2$ concentrations with the higher temperatures of the described range are thus advisable. With temperatures of 55° C. or above, best results accrue by forming dilute partially neutralized aqueous sodium silicate solution, e.g., solutions containing less than 15 grams per liter of $SiO_2$. As a practical matter, however, use of such dilute solutions leads to extremely dilute product slurries which may increase the cost of processing, especially in recovery of the product.

Processing usually is easily accomplished with aqueous product slurries containing 2 to 10 or maybe 15 percent solids by weight. Using acidified sodium silicate containing up to 150 grams per liter $SiO_2$, often 3 to 75 grams per liter $SiO_2$, and controlling the dilution occurring as a consequence of the salt addition (when it is added as an aqueous solution) makes it possible to achieve product slurries of such solid contents.

Moreover, in this embodiment, it is preferable to mix the salt with the partially acidified sodium silicate solution in a particular manner. To obtain optimum paper pigments, calcium chloride or like salt and partially neutralized sodium silicate solution should be mixed rapidly and effectively. The salt should be promptly and well distributed throughout the solution. Mixing is usually done under agitation. Ideally suited to accomplishment of preferred mixing of this nature is use of only relatively small volumes. Rapid mixing as well as uniform distribution of the components throughout the medium is best accomplished in this fashion.

The following examples illustrate the performance of this embodiment:

EXAMPLE IV

Figure 2:
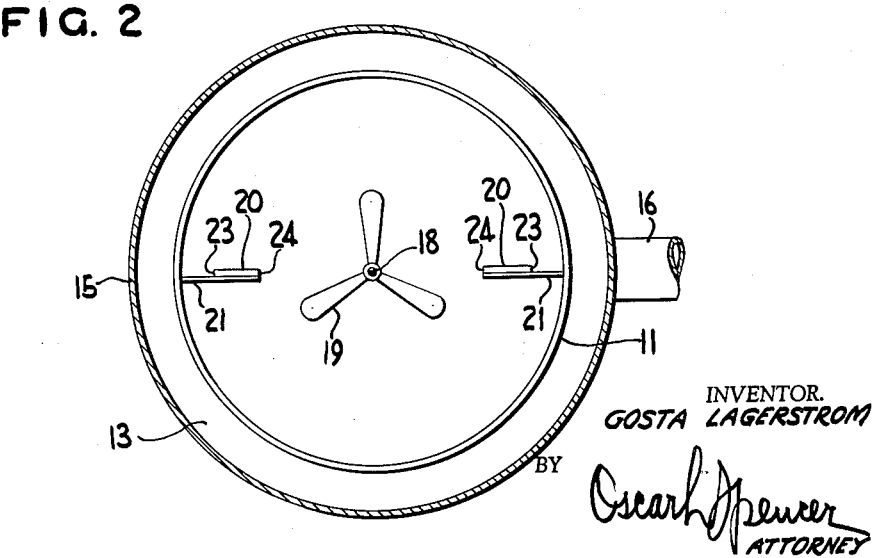

The apparatus employed in this example is illustrated in FIGURES 1 and 2 of the drawing. It included conduit 1, a sodium silicate feed means provided by a 1½ inch inner diameter pipe. Conduit 1 was joined to conduit 4 (a pipe of ¾ inch inner diameter) at 3 through orifice 5, a circular opening ½ inch in diameter. Conduit 4 included a horizontal run 6 of 4 inches and curved section 7 seven inches long having a 5¼ inch radius of curvature and terminated 16 inches above bottom 10 of tank 9.

Pipes 2 and 8 served as the means for adding acid and compressed air as indicated.

Cylindrical tank 9, comprising cylindrical side wall 11, bottom 10 and top lip 12, was 14 inches high and 15 inches in diameter. Its volume was about 10 gallons. Surrounding the upper portion of tank 9 was collection trough 13 (provided by cylindrical side wall 15 and bottom 14) for collecting liquid overflow from tank 9, such overflow being withdrawn via conduit 16 (a 2 inch inner diameter pipe).

Cylindrical side wall 15 extended 2 inches below top lip 12 of tank 9. Cylindrical walls 15 and 11 were concentric, the dameter of the former being 19 inches, 4 inches greater than the diameter of tank 9.

The stirrer was composed of air driven motor 17, drive shaft 18 and a three blade marine propeller 19. As shown best in FIGURE 2, drive shaft 18 was centrally located in tank 9 along its major vertical axis. Shaft 18 terminated 7 inches above bottom 10 at which point the stirring propellers were located. Individual blades of the propeller were about 3½ inches long and equiangularly (120 degrees apart) disposed around the axis of shaft 18.

Two vertical baffles 20, located in tank 9 as shown in FIGURE 2, were anchored to wall 11 by bands 21. Each baffle was a 10 inch high, 2 inch wide and 1/16 inch thick rectangular prism. Lower edges 22 of baffles 20 were parallel to and spaced 1 inch above bottom 10. Edges 23 were spaced parallel to and 1 inch from wall 11.

Conduit 25 (positioned as shown in FIGURE 1 on a side of drive shaft 18 opposite to conduit 7) served as the means for adding salt solution to tank 9. It terminated just at the level of lip 12 of tank 9 and hence, its operation provided for feeding salt to the top surface of the liquid body in tank 9.

Using this apparatus, an aqueous sodium silicate solution at about 25° C. (prepared by mixing 12.5 gallons per minute of water with 9.0 gallons per minute of aqueous sodium silicate containing 25.2 grams of $Na_2O$ per liter and about 3.3 moles of $SiO_2$ per mole of $Na_2O$) was fed through conduit 1. At the rate of 0.85 gallon per minute, hydrochloric acid at about 25° C. containing 4.27 moles of HCl per liter was added through pipe 2 to the stream of sodium silicate in conduit 2. At these feeds, the ratio of acid to sodium silicate was equivalent to neutralizing 50 percent of the sodium silicate. Due to the orifice effect and flow of materials, rapid effective mixing of acid and sodium silicate was achieved.

Through conduit 25, 7.6 gallons per minute of an aqueous solution of calcium chloride and sodium chloride at about 25° C. was fed into tank 9. This solution contained 106 grams per liter of $CaCl_2$ and about 40 grams per liter of NaCl.

Compressed air at about 10 pounds per square inch gauge was introduced into the acidified sodium silicate solution in curved portion 7 of conduit 4. This provided for even further mixing.

The temperature of the liquid in tank 9 was 23° C. to 25° C. Air motor 17 was driven at 50 pounds per square inch gauge air pressure and about 900 revolutions per minute.

In the described apparatus, the volume in conduits 1 and 4 between the point of acid addition (at pipe 2) and discharge end of conduit 4 is calculated to be about 200 milliliters. Under these feed rates, the retention time of the acidified sodium silicate in conduits 1 and 4 was about 0.15 second.

As discharged from conduit 4 into tank 9, the partially acidified sodium silicate solution was essentially free of any precipitated siliceous materials. It was visually a water clear solution.

In tank 9 the general flow of liquid is depicted by the arrows in FIGURE 1. Precipitation of siliceous pigment from the solution discharged into tank 9 from conduit 4 occurred in tank 9 upon contact and mixing with the solution of chloride salts added via conduit 25. The rates of addition were such that a total of 30 gallons per minute of liquid were fed to and removed from tank 9. Thus, the average retention time in tank 9 (10 gallon volume) was approximately 20 seconds.

Feeding the materials and using the described apparatus as above described, siliceous pigment was continuously precipitated over an extended period of time in tank 9, the resulting slurry collected via takeoff conduit 16.

As removed from tank 9, the slurry pH was about 9. This slurry was continuously pumped at 3 gallons per minute to a 30 gallon acidification tank. Hydrochloric acid was continuously added to maintain the pH at 7.5 in the tank. Overflow from the tank was collected and washed in a two Dorr tank system, a continuous decantation system wherein slurry was pumped at the rate of 3 gallons per minute, mixed with overflow from the second Dorr tank, and fed to the first Dorr tank. The underflow from the second Dorr tank was (6 percent solids by weight) fed to rotary vacuum drum filter. The resulting filter cake (18 to 20 percent solids by weight) was dried in a rotary dryer and then milled in an 18 inch vertical mill.

This product was a white, friable, finely divided flocculated siliceous pigment. Its typical chemical composition was:

| | Percent by weight |
|---|---|
| $SiO_2$ | 79.5 (79.1–79.9) |
| CaO | 7.2 (6.8–7.5) |
| $Fe_2O_3$ | 0.12 |
| $R_2O_3$* | 0.47 (0.36–0.53) |
| NaCl | 0.76 (0.60–0.80) |
| $H_2O$ loss on ignition | 12.9 (12.6–13.1) |
| $H_2O$ loss at 105° C | 4.0 (3.6–4.8) |

* Mainly $Al_2O_3$ and $Fe_2O_3$.

Typical physical properties were:

Surface area (BET) _____ 31 (30–33) square meters per gram.
Flocs below 7 microns _____ 98.2 weight percent.
Predominant ultimate particle size _____ 80–160 millimicrons.

Bracketed figures denote range of variations with different samples prepared during performance of this example.

The paper pigmenting qualities of this product was demonstrated by preparing paper having the pigment dispersed therein and measuring the various properties of such papers. This was done by providing 7 liters of an aqueous pulp slurry containing 2 percent pulp by weight (140 grams of pulp dry basis) beaten to 400 milliliters freeness (Canadian Standard).

A 300 cubic centimeter portion of an aqueous slurry containing 14 grams of the pigment was mixed with the prepared pulp for 5 minutes. Then, sufficient $$Al_2(SO_4)_3 \cdot 18H_2O$$

was added to adjust the slurry and white water to about pH 5. This pulp was sheeted on a laboratory Noble-Wood sheeting machine and representative sheets of the respective runs were tested to evaluate their ash contents, opacity, brightness, tear and burst factors.

As above reported, percent opacity is the ratio of brightness of a single sheet with a black backing to the brightness of the same sheet with a white backing; tear factor is in grams per gram of 8 inch by 8 inch sheet and burst factor is in pounds per square inch per gram of 8 inch by 8 inch sheet.

The following data is typical of that obtained by a multiplicity of tests on individual samples:

| | Paper Properties | | | | | |
|---|---|---|---|---|---|---|
| | Ash, Weight Percent | Opacity, Percent | Brightness, Percent | Tear Factor | Burst Factor | $S_{pig}$ |
| No Pigment | 0.3 | 67 | 75 | 28 | 14 | |
| Pigment of Example IV | 7.6 | 83.7 | 81.5 | 45 | 6.7 | 0.54 |

EXAMPLE V

A series of runs were performed in which an aqueous sodium silicate [$Na_2O(SiO_2)_{3.12}$] containing 20 grams per liter $Na_2O$ solution and hydrochloric acid were continuously mixed and discharged into the tank described in Example II. Also fed to the tank was an aqueous solution of calcium chloride and sodium chloride (80–90 grams calcium chloride and 35 grams NaCl per liter). The time between acidification and salt addition was about 0.12 second.

The following table lists the various conditions of product preparation, product properties and results of incorporation samples of the pigment paper:

EXAMPLE VI

Following the procedure and using the apparatus of Example V, salts other than the calcium chloride were employed. One liter per minute of sodium silicate solution (20 grams per liter $Na_2O$) was continuously mixed with 0.65 liter per minute of hydrochloric acid containing sufficient acid to neutralize but 50 percent of the $Na_2O$ and the resulting mixture fed at 1.65 liters per minute. The salt solution fed at the rate of 0.67 liter per minute contained 0.58 mole of salt per liter. The elapsed time from acidification to salt addition was about 0.05 second. In the tank, the slurry was at 25° C.

Products were recovered, samples of which were heat aged and analyzed chemically, Table III listing the pertinent data:

Table I
CONDITIONS OF PRECIPITATION

| Run | Sodium Silicate, grams/liter $Na_2O$ | Mole Excess, $CaCl_2$/mole $Na_2O$ | Percent Neutralization HCl | Slurry Temperature, °C | Feed Rates, liter/minute | | | BET Surface Area, m.²/g. | |
|---|---|---|---|---|---|---|---|---|---|
| | | | | | Sodium Silicate | Acid | Chloride | Unaged | Aged [1] |
| 1 | 7.5 | .06 | 50 | 25 | 1.00 | .50 | 1.00 | --- | 26 |
| 2 | 7.5 | 1.5 | 50 | 25 | 1.00 | .50 | 1.00 | --- | 24 |
| 3 | 10 | .7 | 50 | 25 | 1.22 | .41 | .81 | --- | 22 |
| 4 | 10 | .7 | 60 | 25 | 1.05 | .41 | .625 | --- | 25 |
| 5 | 12.5 | .06 | 50 | 25 | 1.00 | .50 | 1.00 | --- | 22 |
| 6 | 12.5 | 1.5 | 50 | 25 | 1.00 | .50 | 1.00 | --- | 28 |
| 7* | 10.7 | .75 | 60 | 25 | 1.00 | .35 | .50 | 51 | 20 |
| 8* | 10.7 | .75 | 64 | 25 | 1.00 | .35 | .50 | 127 | 30 |
| 9* | 10.7 | .75 | 66 | 25 | 1.00 | .35 | .50 | 152 | 34 |
| 10* | 10.7 | .75 | 70 | 25 | 1.00 | .35 | .50 | 292 | 39 |
| 11* | 10.7 | .75 | 73 | 25 | 1.00 | .35 | .50 | 181 | 47 |
| 12* | 9.1 | 1.10 | 80 | 25 | 1.00 | .70 | .50 | 248 | 97 |

[1] Slurry heated for 3 days at 75° C. to 85° C.
*Runs 7 through 12 were conducted by changing the conditions during a long run and obtaining samples at equilibrium.

Table III

| Run No. | Salt | BET Surface Area m.²/g. | | Composition [1] (Weight Percent) | | | |
|---|---|---|---|---|---|---|---|
| | | Unaged | Aged | Loss on Ignition | RO[2] | $SiO_2$ | Ratio RO to $SiO_2$ |
| 1 | $BaCl_2$ | 26 | 13 | 11.2 | 23.8 | 65.0 | 6.98 |
| 2 | $SrCl_2$ | 97 | 12 | 13.5 | 17.2 | 69.3 | 7.0 |
| 3 | $CaCl_2$ | 147 | 24 | 14.9 | 10.3 | 74.8 | 6.78 |
| 4 | $MgCl_2$ | 506 | 364 | 11.5 | 8.7 | 79.8 | 6.22 |

[1] Aged Material.
[2] RO is the metal oxide corresponding to the oxide of the salt.

The following data using the procedure described in Example IV was obtained:

Table II

| Pigment from Run No. | Properties of Paper Pigmented with Siliceous Products | | | | | | |
|---|---|---|---|---|---|---|---|
| | Ash, Weight Percent | Opacity, Percent | Brightness, Percent | Tear Factor | Burst Factor | $S_{pig}$ | $S_{paper} \times 10^4$ |
| Control | 0.3 | 67.7 | 74.0 | 30 | 11.7 | --- | --- |
| 1 | 7.0 | 83.5 | 83.0 | 37 | 5.9 | 0.52 | 704 |
| 2 | 7.0 | 83.4 | 83.4 | --- | --- | 0.54 | 711 |
| 3 | 7.2 | 83.6 | 82.0 | 35 | 7.2 | 0.50 | 699 |
| 4 | 6.8 | 82.7 | 83.3 | --- | --- | 0.50 | 685 |
| 5 | 7.0 | 83.4 | 82.7 | 40 | 6.9 | 0.52 | 701 |
| 6 | 7.5 | 83.2 | 83.3 | 41 | 6.6 | 0.49 | 698 |
| 7 | 6.9 | 82.8 | 82.2 | 34 | 6.5 | 0.47 | 675 |
| 8 | 6.6 | 83.1 | 82.6 | 35 | 7.4 | 0.51 | 683 |
| 9 | 6.7 | 83.0 | 82.8 | 38 | 7.2 | 0.50 | 685 |
| 10 | 7.5 | 83.4 | 82.6 | 38 | 7.1 | 0.46 | 695 |
| 11 | 7.4 | 82.7 | 82.7 | 39 | 7.1 | 0.44 | 671 |
| 12 | 8.0 | 80.8 | 81.9 | 40 | 6.3 | 0.33 | 606 |

The following paper data was obtained for the aged products by the procedure described in Example IV:

Table IV

| Pigment from Run No. | Properties of Paper Pigmented with the Products | | | | |
| --- | --- | --- | --- | --- | --- |
|  | Ash, Weight Percent | Opacity, Percent | Brightness, Percent | Tear Factor | Burst Factor |
| 1 | 8.4 | 83.1 | 81.7 | 33 | 5.7 |
| 2 | 6.5 | 82.3 | 82.1 | 33 | 6.0 |
| 3 | 7.2 | 82.7 | 83.2 | 31 | 5.2 |
| 4 | 6.8 | 79.5 | 81.6 | 34 | 5.6 |

EXAMPLE VII

Following the procedure and using the apparatus of Example V, a stream of aqueous sodium silicate (15 grams per liter $Na_2O$) containing 3.12 moles of $SiO_2$ per mole of $Na_2O$ at 56.5° C. was continuously acidified with sufficient hydrochloric acid solution of equal volume at 62° C. to react with 60 percent of the sodium silicate and the resulting acidified sodium silicate solution was fed at the rate of 1.0 liter per minute to the tank. An aqueous solution of calcium chloride (26.9 grams per liter) and sodium chloride (10.7 grams per liter) at 64.5° C. was also fed to the tank at the rate of 0.5 liter per minute. The stirrer was run at 1635 revolutions per minute. The slurry in the tank was at 54.5° C. to 56° C. The time elapsing between acidification and addition of chloride salts was 0.13 second.

The slurry was aged overnight at 100° C., filtered, washed and dried. The siliceous pigment was a finely divided, pulverulent, flocculated product having a surface area of 17 square meters per gram and 89.2 percent by weight of its flocs less than 7 microns in size.

Paper was prepared as in Example IV having this pigment therein dispersed. Such paper had an ash weight of 6.8 percent, an opacity of 83.5, a brightness of 85.8, a tear factor of 34 and a burst factor of 6.4, and the pigment had an $S_{pig}$ of 0.52.

There are other expedients for preparing in accordance herewith siliceous paper pigments. Earlier filed application Serial No. 700,747, filed December 5, 1957, and now abandoned, describes preparation of such siliceous pigments from sodium silicate or like metal silicate, hydrochloric acid and calcium chloride or like water soluble salt. Such a process may be practiced to perform a process in accordance with this invention.

As described in said earlier filed application, siliceous paper pigments are prepared by forming an aqueous medium containing hydrochloric acid or like acid, sodium silicate or like alkali metal silicate, and calcium chloride or like salt in proportions as herein described and violently agitating immediately upon its formation this aqueous medium. In forming the aqueous medium containing the reactants, the constituents upon being brought together are subjected to a sudden violent (turbulent) agitation of brief duration. A homogeneous or well dispersed mixture of the reactant is thus formed. Following this brief but intense agitation, the force responsible for the agitation is removed. The medium thus is no longer under violent agitation, but is under relatively quiescent conditions.

After discontinuing the violent agitation and forming the homogeneous mixture, the siliceous pigments are then precipitated from the mixture. Depending upon several factors, the degree to which pigment precipitates subsequent to discontinuing the violent agitation (under relatively quiescent conditions) varies. For the most part, pigment precipitation is advisedly avoided or minimized during the period of turbulence, although some precipitation while there is turbulence is often tolerable.

Quite important is the mixing for the first time of all three reactants by this violent agitation. To insure best results, reactants are not in reactive contact substantially prior to the agitation. Hydrochloric acid or like acid or the salt such as calcium chloride are not prematurely mixed with the sodium silicate, especially when such mixture would result in disadvantageous precipitation of a solid siliceous material from the sodium silicate.

Thus, this procedure entails bringing the three reactants into reactive contact in a common medium for the first time, and immediately and simultaneously agitating violently the common medium. Violent agitation is brief, usually less than 1 second and preferably from 0.001 to 0.1 second. Thus, the medium is subjected to the influence of a positive violent agitating force for less than 1 second, following which the agitating force is discontinued.

One notable expedient for achieving these conditions is to introduce respective streams of reactants into a central area of a centrifugal pump. Under such conditions, agitation of the mixture is effected as the streams of reactants are thrown radially outward by the pump rotor. Upon discharge of the medium from the pump, the forces imparting agitation are no longer being applied.

In most cases, the feed of the respective streams to the pump is limited to an amount below the pump capacity. For example, if the pump is capable of discharging 100 gallons per minute, the amount of reactant solution supplied to the pump is at least 10 percent below, usually 35 percent or more below, this amount. By operating in this manner, an optimum degree of agitation is apparently afforded, thus insuring production of the desired siliceous pigmentary materials.

It is additionally advantageous in the use of a pump reactor or the like to operate at solution throughput rates which avoid or minimize the precipitation of solids within the pump. Still further benefits may be realized by operating the pump while admitting air into the chamber, e.g., permitting the vacuum developed in the chamber to draw in air. Moreover, the pump functions best when substantially no precipitate forms within the pump chamber.

The following examples illustrate the manner in which the use of a centrifugal pump may be employed to provide siliceous pigments of notable paper pigmenting qualities:

EXAMPLE VIII

A large number of pigmentary products were produced from aqueous solutions of sodium silicate, hydrogen chloride and calcium chloride using a centrifugal pump having a chamber with a volume of 12 cubic centimeters, an internal diameter of 42 millimeters and a depth of 10 millimeters. The pump was provided with a two bladed impeller having a diameter of 38 millimeters driven at about 5000 revolutions per minute. As operated in these experiments, air was bled into the pump chamber through an opening in the seal on the face plate surrounding the motor driven axis on which the impeller was mounted. The face plate of the pump was equipped with two separate inlets spaced 22 millimeters apart and along a line representing a diameter of the circular surface of the face plate. Discharge means from the chamber was by way of a one-quarter inch tube opening into the periphery of the chamber. From this tube, the discharge stream was dropped into a 5 liter bucket and collected. The liquid contents collected in the bucket were not agitated. The only motion was due to the addition of the stream.

The capacity of this pump was 7 gallons per minute of water at zero head pressure.

Two feeds pumps were used to pump the respective solutions into the centrifugal pumps. Tygon tubing was used, and the discharge means of these pumps were throttled by use of screw clamps to provide non-pulsating feed.

Using this equipment in the manner above described, an aqueous solution of sodium silicate $Na_2O \cdot (SiO_2)_{3.15}$ and an aqueous solution of calcium chloride and hydrogen chloride were fed to the pump, each solution being fed at the constant rate of 0.2 liter per minute (or a total feed rate of 0.4 liter per minute to the centrifugal pump). As indicated in Table V, the concentration of sodium silicate in its feed solution prior to mixing in the pump was varied from 20 to 40 grams per liter of $Na_2O$. Correspondingly, the concentration of hydrogen chloride in its feed solution was adjusted to provide on an equivolume basis one mole of hydrogen chloride per mole of $Na_2O$. Since the respective solutions are fed at equal volume rates, the centrifugal pump is being charged such that the initial mixture in the pump contains one mole of hydrogen chloride per mole of $Na_2O$. For example, when the concentration of sodium silicate in its feed solution is 20 grams per liter of $Na_2O$, the solution of hydrogen chloride contains 11.8 grams per liter of hydrogen chloride.

The calcium chloride concentration in its feed solution was also varied according to the particular $Na_2O$ concentration of the sodium silicate solution so that the mole ratio at which calcium chloride and $Na_2O$ were fed was at least 0.5 to 1. In many of the experiments tabulated below in Table V, excess calcium chloride was used. Hence, the concentration of calcium chloride in its aqueous feed solution was adjusted accordingly.

Feeding an aqueous solution of silicate and an aqueous solution of hydrogen chloride and calcium chloride to the centrifugal pump for 5 minutes, while controlling the temperature at 50° C., pigmentary products were obtained in an aqueous slurry by collecting the pump discharge. These slurries were filtered on vacuum filters, and the filter cakes washed three times with 1.1 liter portions of distilled water. The washed wet filter cakes were dried at 105° C. for 6 to 12 hours whereafter the materials were conditioned at 50 percent relative humidity overnight and then milled by passing them twice through a laboratory Mikropulverizer.

The following table lists the various other conditions of preparation:

Table V

| Run | $Na_2O$ Concentration of Sodium Silicate Feed Solution, Grams Per Liter | Moles Fed Per Mole of $Na_2O$ Fed | | Weight percent Flocs Below 7 Microns | Properties of Paper Pigmented with the Products | | | | |
|---|---|---|---|---|---|---|---|---|---|
| | | HCl | $CaCl_2$ | | Ash, Weight percent | Opacity, percent | Brightness, percent | Tear Factor | Burst Factor |
| Control [1] | | | | | 0.3 | 67.5 | 77.3 | 27 | 14.3 |
| 1 | 30 | 1 | 0.5 | 92.4 | | | | | |
| 2 | 30 | 1 | 0.7 | 98.7 | 6.6 | 82.4 | 84.1 | 43 | 7.5 |
| 3 | 30 | 1 | 1.0 | 98.0 | 6.8 | 82.9 | 84.5 | 36 | 7.6 |
| 4 | 40 | 1 | 0.5 | 96.8 | 7.1 | 84.2 | 82.4 | 32 | 7.5 |
| 5 | 40 | 1 | 0.7 | 98.8 | 6.7 | 82.5 | 83.9 | 41 | 8.2 |
| 6 | 40 | 1 | 1.00 | 96.6 | 6.8 | 82.1 | 84.0 | 38 | 7.7 |
| 7 | 20 | 1 | .50 | 74.5 | | | | | |
| 8 | 20 | 1 | .70 | 91.1 | 6.9 | 82.8 | 83.3 | 38 | 7.5 |
| 9 | 20 | 1 | 1.00 | 94.0 | 6.7 | 83.1 | 84.8 | 43 | 7.2 |
| 10 | 20 | 1 | 1.20 | 97.1 | 6.8 | 83.7 | 84.1 | 43 | 7.7 |
| 11 | 30 | 1 | 1.20 | 99.6 | 6.9 | 83.7 | 83.8 | 45 | 6.9 |
| 12 | 40 | 1 | 1.20 | 100.0 | 6.6 | 82.1 | 83.6 | 36 | 8.1 |
| 13 | 20 | 1 | 1.50 | | | | | | |
| 14 | 30 | 1 | 1.50 | 94.5 | 6.7 | 82.4 | 83.7 | 29 | 8.3 |
| 15 | 40 | 1 | 1.50 | | | | | | |

[1] Control is paper sheeted from the same pulp slurry without pigment present.

In Table V above, weight percent of flocs below 7 microns in the number of flocs (the pigment being a flocculated product) below 7 microns in diameter.

The properties of the respective pigments as paper pigmenting agents were determined by preparing paper and measuring the respective properties of such papers as described in Example IV.

EXAMPLE IX

Following the procedure and using the equipment described in Example VIII, while operating with solutions and reaction media at 25° C., a further series of pigments were produced, some of which were tested in paper.

Table VI lists the pertinent data:

Table VI

| Run | $Na_2O$ Concentration of Sodium Silicate Feed Solution, Grams Per Liter | Moles Fed Per Mole of $Na_2O$ Fed | | Weight percent Flocs Below 7 Microns | Surface Area Square Meters Per Gram | Properties of Paper Pigmented with the Products | | | | |
|---|---|---|---|---|---|---|---|---|---|---|
| | | HCl | $CaCl_2$ | | | Ash, Weight percent | Opacity, percent | Brightness, percent | Tear Factor | Burst Factor |
| Control [c] | | | | | | 0.3 | 66.5 | 74.5 | 23 | 14.6 |
| 1 | 40 | 1 | 2.0 | 90.2 | 58 | 6.7 | 81.6 | 80.9 | 29 | 9.6 |
| 2 | 40 | 1 | 1.2 | 92.8 | 58 | | | | | |
| 3 | 40 | 1 | 1.0 | 94.0 | 60 | 6.4 | 82.5 | 82.1 | 30 | 8.8 |
| 4 | 40 | 1 | 0.7 | 94.6 | 68 | | | | | |
| 5 | 40 | 1 | 0.5 | 95.1 | 93 | 6.7 | 83.3 | 82.3 | 34 | 8.7 |
| 6 | 20 | 1 | 1.2 | 98.5 | 87 | 6.8 | 83.9 | 84.5 | 37 | 8.5 |
| 7 | 30 | 1 | 1.2 | 98.7 | 92 | 7.2 | 83.5 | 84.0 | 39 | 8.0 |
| 8 | 55 | 1 | 1.2 | 86.4 | 53 | | | | | |
| 9 | 78 | 1 | 1.2 | 71.9 | 62 | | | | | |
| 10 [a] | 40 | 1 | 1.2 | 92.6 | 81 | 5.9 | [b] 79.6 | 79.2 | 33 | 9.5 |

[a] This run 10 was at 5° C.
[b] In this paper, the pulp had a brightness two units less than pulps in the other runs.
[c] The control represents data respecting paper sheeted from the same pulp without pigment.

The physical and paper pigmenting characteristics of the pigments given in Table VI were determined in the manner they were obtained in Example IV.

EXAMPLE X

A further series of pigments were prepared following the procedure of Example VIII. The same apparatus was employed except that feed of the respective solutions was through two feed pipes concentric with the center of the circular surface of the face plate. The inner pipe, through which the calcium chloride-hydrochloric acid solution was fed had an internal diameter of 3.5 millimeters and a wall thickness of 1 millimeter. Aqueous sodium silicate $Na_2O \cdot (SiO_2)_{3.15}$ containing 20 grams per liter of $Na_2O$ was fed at the rate of one liter per second to the pump through the annulus provided by the outer concentric pipe having an internal diameter of 9 millimeters and the inner pipe. The reaction was performed at 25° C.

The aqueous calcium chloride-hydrochloric acid solution contained 43 grams per liter of $CaCl_2$ and 11.8 grams per liter of HCl. In each of the runs, its rate of feed was varied as indicated in Table VI, thus providing varying amounts of hydrochloric acid. Some of the resulting pigments were tested for paper pigmenting qualities in the manner described in Example IV. The data was as follows:

inert gas may be forced into the stream formed at the juncture of the arms with the leg. Usually, the gas is fed under modest superatmospheric pressures, e.g., 10 to 100 pounds per square inch gauge.

In the use of this T type reactor, it is generally also advantageous to withdraw rapidly the violently agitated mixture from the leg. To this end, a relatively short leg is used. Thus, the homogeneous aqueous medium established by the violent mixing at the juncture of the arms and the leg of the T is discharged quickly from the zone of turbulence to a zone of non-turbulence or relative quiescence. Often, in such T reactors, a substantial portion of the product, if not all, is precipitated under these non-turbulent or quiescent conditions.

The following example illustrates the operation of a T type reactor.

EXAMPLE XI

The reactor in these runs comprised a horizontally disposed glass tube (internal diameter, 8.5 millimeters) having a downwardly depending leg 2 centimeters in length. At the point where this leg joins the horizontal tube, it is 8.5 millimeters in internal diameter, and it then tapers downwardly to an internal diameter of 4 millimeters about halfway down its length. Extending upwardly from the horizontal tube vertically above the

*Table VII*

| Run | Feed Rate of $CaCl_2$-HCl Solution (liters per minute) | Percent [a] HCl Neutralization | Properties of Paper Pigmented with the Products ||||| 
|---|---|---|---|---|---|---|---|
| | | | Ash, Weight Percent | Opacity, Percent | Brightness, Percent | Tear Factor | Burst Factor |
| Control [b] | | | 0.3 | 65.5 | 74.8 | 30 | 12 |
| 1 | 1.30 | 64.4 | 6.8 | 82.8 | 84.0 | 47 | 6.0 |
| 2 | 1.20 | 59.8 | 6.5 | 83.0 | 84.6 | 49 | 6.5 |
| 3 | 1.08 | 53.6 | | | | | |
| 4 | 0.936 | 46.5 | | | | | |
| 5 | 0.803 | 39.8 | 6.8 | 82.4 | 84.2 | 43 | 7.0 |
| 6 | 0.723 | 35.9 | 7.2 | 82.9 | 84.4 | 41 | 6.4 |

[a] The percent of sodium silicate neutralized by the HCl in the feed stream.
[b] The control gives data obtained by sheeting a slurry of the same pulp without pigment.

Besides a centrifugal pump type reactor, other reactors may be designed to accomplish the rapid mixing attained by use of a pump. Solutions of the respective reactants may be merged into a unitary body at high velocities such that the agitation imparted to the unitary body by the kinetic energy of the streams is sudden, violent and of brief duration. Thus, an aqueous sodium silicate solution and an aqueous solution of calcium chloride and hydrochloric acid may be merged via the arms of a T tube, using very high flow rates. At the point these solutions merge and form the reaction medium, e.g., the juncture of the leg of the T with its arms, the sudden change in flow direction coupled with the high velocities of the respective streams may be employed to impart the necessary agitation. Additionally, by reducing the diameter of the arms of the T (and creating a Venturi effect) at the point of their juncture with the leg, achievement of the desired agitation is facilitated.

The violent agitation or turbulence is further facilitated or imparted by blowing a gas stream into the mixture as it is formed. Thus, in the operation of a T reactor, air or other gas such as nitrogen, neon steam or like point where the leg joins the tube is a tube (2.5 millimeters inner diameter) through which the air or steam is fed.

This reactor was employed to prepare pigment by feeding for 1.5 minutes at the rate of 1.3 liters per minute an aqueous $Na_2O \cdot (SiO_2)_{3.15}$ solution containing 20 grams per liter $Na_2O$ from one side of the horizontal tube and feeding from the other side an aqueous solution of calcium chloride and hydrochloric acid at the same rate. The concentrations of $CaCl_2$ and HCl in the stream were such that 1.2 moles of $CaCl_2$ and 1.0 mole of HCl per mole of $Na_2O$ were fed to the reactor. These streams met at the point where the leg joined the tube, were violently mixed (air or steam at 15 pounds per square inch gauge being fed to the point of meeting via the upwardly extending tube) and discharged downwardly through the leg into a 5 liter pail.

The respective feed solutions were at 25° C. With air agitation, the resulting stream was at 25° C. However, when steam was used, the reaction mixture discharged from the reactor and as collected in the pail was at 39° C.

The respective slurries formed and collected in the pail were then filtered, the filter cake water washed, dried at 105° C. and milled. Samples of each pigment were tested in paper according to the paper making procedure described in Example VI with these results:

*Table VIII*

| Pigment | Properties of Paper Pigmented with the Products | | | | |
|---|---|---|---|---|---|
| Prepared Using | Weight Percent Flocs Below 7 Microns | Ash, Weight Percent | Opacity, Percent | Brightness, Percent | Tear Factor | Burst Factor |
| Air | 100 | 6.8 | 83.1 | 83.2 | 37 | 7.7 |
| Steam | 95.4 | 7.0 | 82.4 | 83.4 | 40 | 7.3 |

In preparation of exemplary siliceous paper pigments useful especially for imparting optical properties to paper, the conditions under which the three important reactants are brought together into reactive contact, notably the alkali metal silicate, acid and salt, is best accomplished by handling relatively small volumes of the reaction medium. That is, uniformity of conditions within the aqueous media formed during any step in the contemplated procedures is quite important. As indicated, in many of the more readily performed expedients for accomplishing this invention, speed of formation and periods of standing of the resulting media are quite important. Thus, reacting large volumes of materials is either inconsistent with establishment of these optimum conditions or makes their establishment extremely difficult.

Expedients best suited to achieving conditions here required, especially when large scale production is desirable, are preferably performed on a continuous or semi-continuous basis as distinguished from true batch operation. Accordingly, as some of the examples illustrate, the acidified sodium silicate solution is prepared by continuously mixing proportioned amounts of acid and sodium silicate to form a moving stream which subsequently is contacted at the proper period of time with the salt.

As indicated in data found in the tables of some of the examples, the pigmentary compositions prepared in accordance with this invention are particularly effective for inclusion in paper. They provide enhanced optical properties such as opacity and brightness. They may also be employed to coat surfaces of paper with or without use of an adhesive such as starch to improve ink receptivity, slip resistance, optical properties, etc. However, while many of the products which may be produced in accordance with this invention are noteworthy paper pigments, the pigmentary products of the process may be used for other purposes. They may be used as solid diluents (or carriers) in finely divided compositions of agricultural chemicals such as benzene hexachloride dusting compositions. Also, they may be used for reinforcing natural rubber, synthetic rubbers (e.g., GR–S and like rubbery polymers) and silicone rubbers.

As precipitated, these finely divided siliceous pigmentary compositions are comprised chemically of $SiO_2$ and usually one or more metal oxides, notably an alkaline earth metal oxide. Thus, when calcium chloride is used, the precipitated composition contains calcium oxide. Whether the $SiO_2$ and alkaline earth metal oxide are present as an intimate mixture of silica and alkaline earth metal silicate or an alkaline earth metal silicate having a high ratio of $SiO_2$ to alkaline earth metal oxide is not entirely understood. Most of the calcium oxide-silicon dioxide products can be represented on an anhydrous basis by the formula: $CaO(SiO_2)_x$ wherein $x$ is a value from 2 to 15, including fractional numbers, or even higher, and preferably, 5 to 11.

Thus, many of these pigmentary compositions contain a substantial content of calcium oxide or like metal oxides (10 to 15 percent by weight of the dried product), the particular metal oxide often being correlated to the metal of the particular salt employed for preparation and precipitation.

At least a portion of the calcium oxide (or like metal oxide) content of the precipitated products may be removed, for example, by acidification of the slurry, or after heat aging the slurry to stabilize the pigment against large changes in surface area. Usually, heating for at least several hours at 50° C. or higher suffices to effect such stabilization.

Many water soluble acidic materials (inorganic or organic) especially acids which form water soluble salts with the metal of the oxide may be used to reduce this metal oxide content. Typical acids are hydrochloric, phosphoric, sulfuric, sulfurous, nitric, acetic and carbonic or any of their corresponding anhydrides such as $SO_2$, $SO_3$ and $CO_2$. Acidic materials such as acid salts like aluminum sulfate may be used, although they result in replacing metal oxide with a different metal oxide, e.g., $Al_2O_3$.

Moreover, if desirable, it is possible by the use of various salts to provide siliceous pigments comprised of mixtures of metal oxides and silica, e.g., a mixture of $Al_2O_3$, $Na_2O$ and silica.

In many instances, it is advantageous to remove but partially metal oxide such as calcium oxide in this acidification treatment and thus obtain a product having a higher ratio of $SiO_2$ to metal oxide. Calcium oxide sometimes influences favorably pigment retention in paper, a valuable property for a paper pigment. Nevertheless, too great a metal oxide content, especially alkaline oxide, may result in more alkalinity than favored by the paper manufacture. Partial but incomplete removal of metal oxide is accordingly often an advantageous practice. A typical calcium oxide-$SiO_2$ product, after partial calcium oxide removal, may contain 4 to 7 percent CaO by weight of the pigment including free and bound water.

When alkaline earth metal chloride or a contemplated salt other than a calcium salt is employed, the metal oxide present will correspond to the metal cation of the salt.

Besides the principal components present in the product as precipitated, e.g., silica and metal oxide, minor concentrations of other components are often present on the order of less than about 6 percent by weight of the composition on an anhydrous basis. Thus, other metals such as aluminum, iron, sodium and the like may be present.

A typical analysis of a siliceous composition precipitated by this invention is as follows:

Percent by weight
$SiO_2$ ------------------------------------------- 71.8
CaO -------------------------------------------- 10.4
$R_2O_3$ ------------------------------------------- 1.0
Na --------------------------------------------- 0.08
Cl --------------------------------------------- 0.01
Loss of $H_2O$ at 105° C. ----------------------- 9.28
Loss of $H_2O$ at ignition temperatures --------- 16.27

Two types of water are present in these pigments. They contain "free water" which as herein intended refers to that water which may be removed from the pigment by heating at 105° C. in a laboratory oven for 24 hours. They also contain "bound water" which as herein intended refers to that water which may be removed from the product by heating at ignition temperatures, 1000° C. to 1200° C. for an extended period of time, e.g., 24 hours, less "free water." Apparently, the bound water is chemically associated with the composition. Usually, the free water content is about 2 to 10 percent by weight of the composition while the bound water constitutes between 2 and 10 percent by weight of the pigment.

These pigmentary compositions are finely divided, amorphous, flocculated products having an average ultimate particle size of less than 1.0 micron and normally 0.005 to 0.5 micron. Siliceous pigmentary composition may be directly precipitated which has the predominant weight portion of its ultimate particles in the diameter size range of 0.08 to 0.16 micron. Some ultimate particles may be present ranging as low as 0.01 and as high as 0.40 micron. However, the weight proportion of ultimate particles outside the predominant ultimate particle size range is quite small. Other products produced in accordance with the present invention appear to be comprised of ultimate particles in two distinct size ranges. Thus, compositions may be prepared having a significant number of ultimate particles sized between 0.03 to 0.06 micron in diameter and other ultimate particles between 0.1 to 0.5 micron in diameter.

Those pigments which are useful to an exceptional degree for imparting optical properties to paper are also flocculated. This flocculated condition is due to the aggregation or agglomeration of a plurality of ultimate particles. Under the electron microscope, these flocs may be likened to grape clusters in which the individual grape represents the ultimate particle and the floc (or agglomerate) denotes the grape cluster. A substantial portion of these flocs are formed from so firmly bonded ultimate particles that the flocs resist to a substantial degree degradation to ultimate particles even when micropulverized or comparably ground. Best pigments herein provided for purposes of improving the optical properties of paper are highly and controllably flocculated such that more than 90 percent by weight of the pigment is in the form of flocs (comprised of ultimate particles of 0.08 to 0.16 micron) of less than 7 microns, the preponderant weight proportion of which is in a floc size of between 0.5 and 7 microns. Many pigments (as observed under the electron microscope) are comprised of flocs which are predominantly in the size range of about 0.5 to 2.0 microns.

As precipitated, these pigmentary compositions are usually in the form of a dilute aqueous slurry containing considerable salt and from 1 to 10 percent (usually 2 to 5 percent) solids by weight. Recovery from this slurry of product in suitable form for commercial shipment and use in pigmenting paper and the like entails separating a substantial portion of the water and salt. Salt and some of the water may be removed by settling and decantation, filtration, centrifugation and the like mechanical separatory practices. One procedure is to use equipment designed to effect decantation, e.g., Dorr tanks. Agents which enhance settling often are added, including quarternary ammonium salts, high molecular weight amines, aluminum salts such as aluminum chloride, and aluminum sulfate. As a rule, the thickened slurry obtained from a 3 percent slurry contains 5 to 8 percent solids by weight. This thickened slurry may be filtered to obtain a wet filter cake, usually containing 15 to 20 or possibly 25 percent solids by weight.

A substantial portion of the remaining water may then be removed by drying through the use of heat to evaporate most of the water. As a general rule, this drying is not performed to remove all of the free water. Thus, typical pigmentary compositions which appear dry and pulverant still contain between 2 and 10 or even 12 percent by weight of free water.

During drying, for example, by treating the wet filter cake with hot gases and evaporating water from the pigments while tumbling, the pigmentary composition usually is obtained in the form of drier pellets. These pellets may be mechanically ground or broken up, or may even be used directly in the pigmentation of paper since they disperse effectively in water. Apparently, the drier pellets are extremely loose packings of flocs which are readily disrupted and converted into the flocs either by mechanical grinding or even when the pellets are dispersed in a beater pulp under conditions encountered in paper making operations.

On the other hand, the flocs which are aggregations or agglomerations of a plurality of ultimate particles are not so easily disintegrated. Instead, all indications are that they persist during the treatments encountered in the preparation of paper pulps and hence, the pigment finds itself dispersed in the paper in a flocculated condition.

In the foregoing, references have been made to specific reagents. It will be understood, however, that the invention is not limited to use of only such reagents for precipitation of siliceous pigments.

Any alkali metal silicate such as sodium silicate potassium silicate, lithium silicate and sodium potassium silicate is suitable. Preference for sodium silicate is due to its availability. Alkali metal silicates containing between 2 and 5 moles of $SiO_2$ per mole of alkali metal oxide are used most frequently. Nevertheless, alkali metal silicates having more than 5 moles of $SiO_2$ per mole of $Na_2O$ may be used.

Water soluble acids, especially those having a hydrogen cation and an anion which forms a water soluble salt with the alkali metal (of the alkali metal silicate) are ideal. Inorganic acids including hydrochloric acid, nitric acid, nitrous acid, sulfuric acid (or $SO_3$), carbonic acid (or $CO_2$), the phosphoric acids, sulfurous acid (or $SO_2$) and the like are contemplated. Also of use are acetic acid, formic acid, the chloroacetic acids and like organic acids. Acids which dissolve slowly in aqueous media may be first dissolved in water and mixed with other reagents in the process as water solutions.

The choice of acid may be further governed by the salt employed in the precipitation. Acids having anions which form water soluble salts with the cations of the salt present during precipitation are usually preferred. With carbonic acid and calcium chloride, calcium carbonate may be coprecipitated with the siliceous pigment. Separation with its components of this type of coprecipitate is not easy. Presence with the siliceous pigment of coprecipitated calcium carbonate may or may not be desirable.

When choice of acid is premised upon the acid anion forming a water soluble salt, it will be understood salts are water soluble if they dissolve in the reaction medium. slightly water soluble salts, e.g., those having a solubility of at least 2 grams per liter of water (calcium sulfate), are water soluble as herein intended when the reaction medium is adequately dilute to dissolve.

Besides this alkali metal silicate and suitable acid, the precipitation herein contemplation is conducted with salt present. This salt is important to formation of a precipitate according to the general principles hereof.

Among the useful salts are sodium chloride, calcium chloride, zinc chloride, mixtures of such salts and like water soluble chlorides. Using a salt such as calcium chloride, the siliceous products analytically contain a significant amount of calcium reported usually as calcium oxide. It appears besides playing an important role in providing appropriate conditions of precipitation that the calcium chloride reacts with a siliceous component of the system. Not all the alkali metal oxide content of the sodium silicate is neutralized with the acid. Only between 0.3 and 0.7 equivalents of acid per equivalent of alkali metal oxide of the alkali metal silicate, for example, are used with a silicate having 3.3 moles of $SiO_2$ per mole of alkali metal oxide. Thus, the siliceous product as precipitated contains calcium oxide or like metal oxide, depending upon the salt employed, in an amount corresponding approximately to the reaction of the salt with the sodium silicate in excess of that which will react with the quantity of employed acid.

Besides metal chloride salts, there are other suitable water soluble metal salts. Thus, water soluble metal salts of strong acids (e.g., acids having an ionization constant of at least $1 \times 10^{-2}$) may be suitable and include the metal nitrites, calcium nitrate and sodium nitrate; the bromides and iodides such as calcium bromide, sodium iodide; the metal sulfates such as sodium sulfate.

Other salts such as sodium aluminate, potassium aluminate or other alkali aluminates may be useful. Many of these salts form water insoluble silicates under the conditions of precipitation.

Varying amounts of calcium chloride or like salt are employed. Usually employed is at least sufficient calcium chloride or like salt to react with an amount of $Na_2O$ in the sodium silicate which would not be neutralized by the acid. Thus, with an $Na_2O(SiO_2)_{3.3}$ or like alkali metal silicate where but 0.3 to 0.7 equivalents of acid per equivalent of alkali metal oxide of the alkali metal silicate is employed, at least about 0.7 to 0.3 equivalents of calcium chloride per equivalent of alkali metal oxide basis the total amount of alkali metal silicate should be employed. In many instances, an excess of calcium chloride or like salt over and above the amount which would be required to react with this alkali metal oxide content of the alkali metal silicate is useful. To this end, even very large excesses of salts are not detrimental, although they may result in added costs. Typically, stoichiometric excess of salt is from 50 to 300 percent.

As reported and used herein, the term "BET surface area" or "surface area" refers to the surface area of the pigment as measured by the Brunauer-Emmett-Teller method described in the Journal of the American Chemical Society, volume 60, page 30 (1938).

The floc sizes herein mentioned are determined by a specific procedure, which although not necessarily providing an absolute measurement, does establish a scientifically significant, readily determinable standard. The procedure involves warming an aqueous pyrophosphate solution containing 0.05 percent pyrophosphate by weight to 30° C. in a water bath. This solution is prepared by neutralizing distilled water to a pH of 7 with sodium hydroxide and dissolving 0.84 gram of tetrasodium pyrophosphate decahydrate in each liter of neutral water. To approximately 250 cubic centimeters of this heated solution is added 2.50 grams of silica and the resulting mixture is treated in a Waring Blendor for exactly 15 seconds, whereafter the slurry is transferred to a 250 milliliter graduated, stoppered cylinder and mixed thoroughly by inverting the cylinder. The level is adjusted to the 250 milliliter mark before mixing.

After mixing, the cylinder is placed in the upright position and a timer started. Immediately, a 5 milliliter pipette so fitted with a rubber stopper that it will reach exactly 2.2 centimeters below the 245 milliliter mark of the cylinder is inserted and a 5 milliliter slurry sample is withdrawn into a tared weighing bottle. After 49 minutes, a second sample is withdrawn into a tared weighing bottle and the respective samples are dried at 105° C. in an oven overnight.

The ratio times one hundred of the weight of the second sample divided by the weight of the first sample is the percent of flocs less than 7 microns in diameter.

The S pigment and S paper values herein reported are calculated values based upon data obtained from actual pigmentation of paper with the pigments and physical properties such as index of refraction of the pigment. Such values indicate the fundamental pigmentary value in paper of the siliceous product at ash contents of paper in the range of 6 to 9 percent by weight. The higher the S pigment value, the greater the pigmenting quality for optical properties of the product. Products such as herein provided having S pigment values above about 0.48 are notable paper pigments. Many of these pigments have S pigment values of about 0.50 to about 0.56 or even somewhat higher. By the principles employed to arrive at the S pigment values, the variations in opacity and brightness due to pulp variations and other variants are canceled.

Siliceous product as herein employed refers to products having at least 50 percent by weight $SiO_2$ on an anhydrous basis, and usually at least 75 percent $SiO_2$ by weight on an anhydrous basis.

This application is a continuation-in-part of application Serial No. 700,747, filed December 5, 1957 and now abandoned.

While the present invention has been described by reference to specific details of certain embodiments, it is not intended that the invention be construed as limited to such details except insofar as they appear in the appended claims.

I claim:

1. A method of preparing a siliceous pigment which comprises rapidly distributing in an aqueous siliceous solution having an $SiO_2$ to alkali metal oxide ratio such that the solution upon standing itself will precipitate siliceous material sufficient water soluble inorganic salt to precipitate a major portion of the $SiO_2$ as siliceous pigment from the resulting medium before substantial occurrence in said solution of such self-precipitation.

2. A method of preparing a siliceous pigment which comprises rapidly distributing in an aqueous siliceous solution having at least 5 moles of $SiO_2$ per mole of alkali metal oxide and upon standing itself capable of precipitating siliceous material sufficient water soluble inorganic salt of a strong acid to precipitate a major portion of the $SiO_2$ as siliceous pigment from the resulting medium before substantial occurrence in said solution of such self-precipitation.

3. A method of preparing a siliceous pigment which comprises rapidly distributing in an aqueous siliceous solution having at least 5 moles of $SiO_2$ per mole of $Na_2O$ and upon standing itself capable of precipitating siliceous material sufficient inorganic water soluble salt of a strong acid to precipitate a major portion of the $SiO_2$ as siliceous pigment from the resulting medium before substantial occurrence in said solution of such self-precipitation.

4. A method of preparing siliceous pigment which comprises mixing sufficient acid and aqueous alkali metal silicate to form an acidic aqueous solution of water soluble siliceous products substantially free of water insoluble siliceous products of the alkali metal silicate, rapidly establishing an aqueous reaction medium of said solution, silicate ion and enough water soluble inorganic salt to initiate precipitation of siliceous pigment and promptly upon providing this medium precipitating siliceous pigment therefrom.

5. A method of preparing siliceous pigment which comprises mixing sufficient acid and aqueous sodium silicate to form an acidic aqueous solution of water soluble siliceous products substantially free of water insoluble siliceous products of the sodium silicate, rapidly establishing an aqueous reaction medium of said solution, silicate ion and enough water soluble inorganic salt to initiate precipitation of siliceous pigment and promptly upon providing this medium precipitating siliceous pigment therefrom.

6. A method of preparing siliceous pigment which comprises mixing sufficient acid and aqueous sodium silicate to form an acidic aqueous solution of soluble siliceous products substantially free from solid siliceous products of the sodium silicate, rapidly establishing a homogeneous aqueous reaction medium of said solution, silicate ion and enough water soluble inorganic metal salt of a strong acid to initiate precipitation of siliceous pigment and promptly upon providing this medium precipitating therefrom siliceous pigment.

7. A method of preparing siliceous pigment which comprises rapidly mixing sufficient acid and aqueous alkali metal silicate to form an acidic siliceous solution, distributing alkali metal silicate and water soluble inorganic salt in such solution to provide a precipitation medium, and rapidly precipitating siliceous pigment from the medium.

8. A method of preparing siliceous pigment which comprises rapidly mixing aqueous alkali metal silicate and sufficient acid to form an aqueous siliceous solution of below pH 4, distributing in sufficient amounts alkali metal silicate and water soluble inorganic salt throughout the solution to provide a precipitation medium and precipitating siliceous pigment from the medium upon provision thereof.

9. A method of preparing siliceous pigment which comprises rapidly mixing aqueous alkali metal silicate and enough acid to form an aqueous siliceous solution of below pH 4 substantially free of siliceous materials precipitated from the alkali metal silicate, distributing alkali metal silicate and water soluble inorganic salt throughout the solution in amounts sufficient to provide a precipitation medium and precipitating siliceous pigment from the medium upon provision thereof.

10. A method of preparing siliceous pigment which comprises rapidly mixing aqueous alkali metal silicate and enough acid to form an aqueous siliceous solution of below pH 4 substantially free of siliceous materials precipitated from the alkali metal silicate, distributing alkali metal silicate and inorganic salt throughout the solution to provide a precipitation medium, the amount of alkali metal silicate so distributed being sufficient to establish the precipitation medium at a pH of at least 6, and thereupon precipitating siliceous pigment from the medium.

11. The method of claim 10 wherein the alkali metal silicate contains 3.0 to 3.6 moles of $SiO_2$ per mole of alkali metal oxide and the ratio of acid and alkali metal silicate used in forming the precipitation medium is 0.3 to 0.7 acid equivalents per equivalent of alkali metal oxide of all the alkali metal silicate.

12. A method of preparing siliceous pigment which comprises adding aqueous alkali metal silicate to a liquid body of acid to form a siliceous solution substantially free of siliceous materials precipitated from the alkali metal silicate and at a pH no greater than 4, distributing further alkali metal silicate and sufficient water soluble inorganic salt throughout the solution to form a precipitation medium and precipitating siliceous pigment from the medium upon its formation.

13. The method of claim 12 wherein the amount of further alkali metal silicate is sufficient to provide the medium at a pH of at least 6.

14. The method of claim 13 wherein the alkali metal silicate is sodium silicate and the acid is hydrochloric.

15. A method of preparing siliceous pigment which comprises adding only sufficient aqueous sodium silicate to a liquid body of acid and inorganic water soluble metal salt of a strong acid to form a siliceous solution of a pH no higher than 4 and substantially free of siliceous material precipitated from the sodium silicate, rapidly mixing the solution and additional sodium silicate to establish an essentially homogeneous precipitation medium and precipitating siliceous pigment from the medium upon its establishment.

16. The method of claim 15 wherein the amount of sodium silicate mixed with the solution is sufficient to provide for a pH of at least 6 in the precipitation medium.

17. The method of claim 15 wherein the salt is a metal chloride.

18. The method of claim 15 wherein the salt is calcium chloride.

19. The method of claim 15 wherein the liquid body of acid contains sodium chloride and calcium chloride.

20. A method of preparing siliceous pigment which comprises slowly adding aqueous sodium silicate containing 3.0 to 3.6 moles of $SiO_2$ per mole of $Na_2O$ to an agitated liquid body of hydrochloric acid and water soluble inorganic metal salt of a strong acid thereby forming a siliceous solution of a pH no higher than 4 substantially free of siliceous material precipitated from the sodium silicate, distributing sufficient additional sodium silicate rapidly in the solution to establish a homogeneous precipitation medium of at least pH 6, the amount of sodium silicate so distributed providing an overall ratio of 0.3 to 0.7 acid equivalents per $Na_2O$ equivalent of all sodium silicate employed in providing the medium, and rapidly precipitating siliceous pigment from the medium.

21. The method of claim 20 wherein the salt is calcium chloride.

22. The method of claim 20 wherein the hydrochloric acid body contains as salt calcium chloride and sodium chloride.

23. A method of preparing siliceous pigment which comprises establishing an aqueous siliceous solution containing 5 to 20 moles of $SiO_2$ per mole of alkali metal oxide, this ratio of $SiO_2$ to alkali metal oxide in the solution being such that $SiO_2$ will upon standing precipitate as siliceous material from the solution, and prior to precipitation of any substantial amount of such siliceous material rapidly distributing water soluble alkaline earth metal salt of a strong acid in the solution whereby to precipitate $SiO_2$ from solution as siliceous pigment.

24. The method of claim 6 wherein the salt is a water soluble alkaline earth metal salt of an acid having an ionization constant of at least $1 \times 10^{-2}$.

25. The method of preparing a finely divided, pigmentary, siliceous composition which comprises forming a solution of an alkali metal silicate, an acid having a hydrogen cation and an anion which forms a water soluble salt with the alkali metal of said silicate, and a water soluble alkaline earth metal salt, proportioning the composition of the solution such that the precipitated siliceous pigment contains from 5 to 15 moles of $SiO_2$ per mole of alkaline earth metal oxide, the concentration of reagents in said solution being such that the precipitation therefrom provides a slurry containing up to 15 weight percent precipitated siliceous solids, subjecting the solution to violent agitation of brief duration essentially as the solution is formed, and thereafter discontinuing the agitation whereby to precipitate siliceous pigment.

26. The method of claim 25 wherein the alkali metal silicate is sodium silicate.

27. The method of claim 25 wherein the reagents are first brought into a common medium in a centrifugal pump and violently agitated within the pump, and wherein the unitary medium established in the pump is discharged without substantial precipitation.

28. The method of preparing a finely divided, pigmentary, siliceous composition which comprises forming a solution of an alkali metal silicate, hydrogen chloride and a water soluble alkaline earth metal salt, proportioning the composition of the solution such that it contains between 0.6 to 1.4 moles of hydrogen chloride per mole of alkali metal silicate and sufficient alkaline earth metal salt to react with alkali metal silicate not reacted with the hydrogen chloride, the concentration of reagents in such solution being such that precipitation therefrom of siliceous pigment will provide a slurry containing up to 15 percent precipitated siliceous solids by weight of the slurry, subjecting the solution to violent agitation of brief duration of less than one second essentially as the solution is formed, and thereafter discontinuing the agitation whereby to precipitate siliceous pigment.

29. The method of preparing a finely divided, pigmentary, siliceous composition which comprises forming an aqueous solution of sodium silicate, hydrogen chloride and calcium chloride, proportioning the solution composition such that it contains 0.6 to 1.4 moles of hydrogen chloride per mole of sodium silicate and sufficient calcium chloride to react with sodium silicate which is not reacted with hydrogen chloride, the concentration of reagents in the aqueous solution being such that precipitation of siliceous pigment therefrom will provide up to 15 percent precipitated siliceous solids by weight of the slurry, subjecting the solution simultaneously with its formation to brief violent agitation and discontinuing the agitation whereby to precipitate a calcium oxide-silica pigment.

30. The method of claim 29 wherein the solution composition contains 0.6 to 1.1 moles of hydrogen chloride per mole of sodium silicate.

31. The method of claim 29 in which the sodium silicate concentration in the solution as formed is between 5 to 15 grams $Na_2O$ per liter.

32. The method of claim 31 wherein the solution contains calcium chloride in excess of that required to react with sodium silicate.

33. A method of preparing finely divided, siliceous pigments which comprises merging a stream of aqueous alkali metal silicate solution with a stream of aqueous hydrogen chloride and calcium chloride solution to form a unitary aqueous body, proportioning the respective streams such that the unitary body is initially constituted of between 0.6 to 1.4 moles of hydrogen chloride per mole of alkali metal silicate and at least sufficient calcium chloride to react with alkali metal silicate not reacted with hydrogen chloride, the concentration of reagents in said unitary aqueous body being such as to provide upon precipitation therefrom of siliceous pigment slurry containing up to 15 percent precipitated siliceous solids by weight of the slurry, simultaneously with its formation subjecting the unitary body to sudden violent agitation of brief duration of less than one second and discontinuing the agitation.

34. A method of preparing finely divided, siliceous pigments which comprises merging a stream of aqueous alkali metal silicate with a stream of aqueous hydrogen chloride and calcium chloride solution to form a unitary body, the concentration of reagents in the unitary body being such as to provide upon precipitation therefrom of siliceous pigment slurries containing up to 15 percent precipitated siliceous solids by weight of the slurry, simultaneously with the formation of the body subjecting it to sudden violent agitation of brief duration of less than one second, discontinuing the agitation and precipitating pigment while violent agitation is discontinued, and proportioning the respective streams such that as it is formed the unitary body contains 0.6 to 1.4 moles of hydrogen chloride per mole of alkali metal silicate and at least sufficient calcium chloride to react with alkali metal silicate not reacted with the hydrogen chloride.

35. The method of claim 34 wherein the alkali metal silicate is sodium silicate.

36. The method of claim 34 wherein pigment precipitates in the liquid body after the violent agitation is discontinued.

37. The method of preparing a finely divided, pigmentary, siliceous composition which comprises forming an aqueous medium from alkali metal silicate, hydrogen chloride and a water soluble alkaline earth metal salt, proportioning the ratio in which these components are employed in forming the medium to between 0.6 to 1.4 moles of hydrogen chloride per mole of alkali metal silicate and so that the total acid equivalents of the hydrogen chloride and salt at least equal to the acid equivalents of the alkali metal silicate, the degree of dilution being such that said medium contains as formed 1 to 50 grams of alkali metal oxide per liter, subjecting the medium to violent agitation of brief duration of less than one second essentially as it is formed, and thereafter discontinuing the agitation whereby to precipitate a siliceous pigment.

38. The method of claim 37 wherein the alkali metal silicate is sodium silicate and the alkali metal oxide is $Na_2O$.

39. The method of preparing a finely divided, siliceous pigment which comprises feeding to a centrifugal pump aqueous solutions of alkali metal silicate, hydrogen chloride and calcium chloride and bringing all three of said reactants into a common medium for the first time in the centrifugal pump, proportioning the respective feeds to the pump such that between 0.6 to 1.4 moles of hydrogen chloride per mole of alkali metal silicate are fed and the total acid equivalents of the hydrogen chloride and salt at least equal to the acid equivalents of the alkali metal silicate fed to the pump, the concentration of reagents in such solutions fed to the centrifugal pump being such as to provide upon precipitation therefrom of siliceous pigment slurries containing up to 15 percent precipitated siliceous solids by weight of the slurry, violently agitating for less than one second the medium within the centrifugal pump forming a unitary medium, discharging the unitary medium from the pump and precipitating siliceous pigment in said medium subsequent to the discharge.

40. The method of claim 37 wherein the alkali metal silicate is sodium silicate.

41. The method of claim 34 wherein the unitary body is formed by feeding the streams into a centrifugal pump, the violent agitation is imparted by the action of the centrifugal pump, and pigment is precipitated after discharge of the aqueous medium from the centrifugal pump chamber.

42. The method of claim 38 wherein the alkali metal silicate is sodium silicate having 2 to 5 moles of $SiO_2$ per mole of $Na_2O$.

References Cited in the file of this patent

UNITED STATES PATENTS

| | | |
|---|---|---|
| 2,679,463 | Alexander et al. | May 25, 1954 |
| 2,805,956 | Pechukas | Sept. 10, 1957 |

UNITED STATES PATENT OFFICE
CERTIFICATE OF CORRECTION

Patent No. 3,034,914

May 15, 1962

Gosta B. Lagerstrom

It is hereby certified that error appears in the above numbered patent requiring correction and that the said Letters Patent should read as corrected below.

Column 1, line 32, for "dsirable" read -- desirable --; line 55, before "metal" insert -- alkali --; column 3, line 6, for "solution" read -- condition --; column 6, line 14, for "about" read -- above --; column 7, line 5, for "dameter" read -- diameter --; column 14, line 42, for "in" read -- is --; column 19, line 59, for "quarternary" read -- quaternary --; column 20, line 52, for "slightly" read -- Slightly --; line 57, for "herein" read -- here in --; column 23, line 28, after "inorganic" insert -- water soluble metal --.

Signed and sealed this 1st day of January 1963.

(SEAL)
Attest:

ERNEST W. SWIDER
Attesting Officer

DAVID L. LADD
Commissioner of Patents